Dec. 18, 1923.

A. STUBER

REGISTERING MECHANISM

Filed Nov. 5, 1917

WITNESSES:
Francis Jerdone Jr
Alvin K. Goodwin

INVENTOR.
Adolph Stuber
BY
his ATTORNEYS.

Dec. 18, 1923.
A. STUBER
1,478,010
REGISTERING MECHANISM
Filed Nov. 5, 1917     5 Sheets-Sheet 3
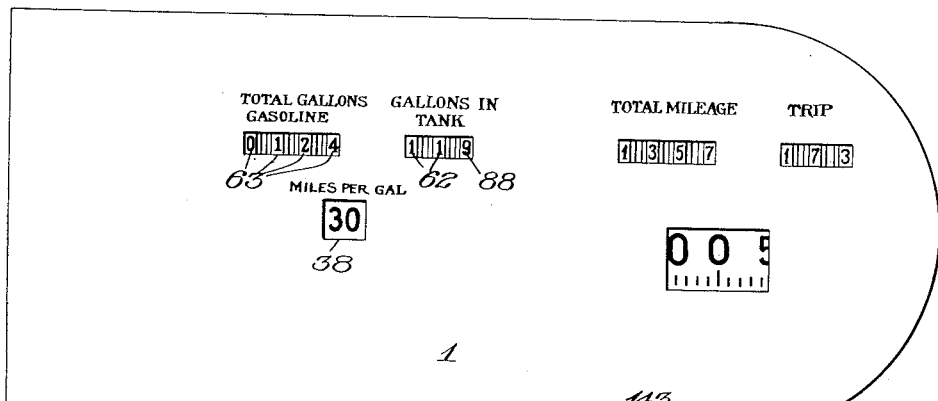
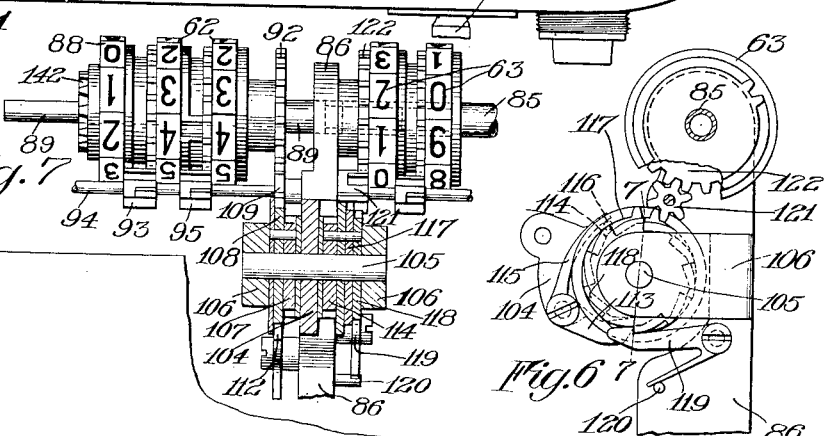
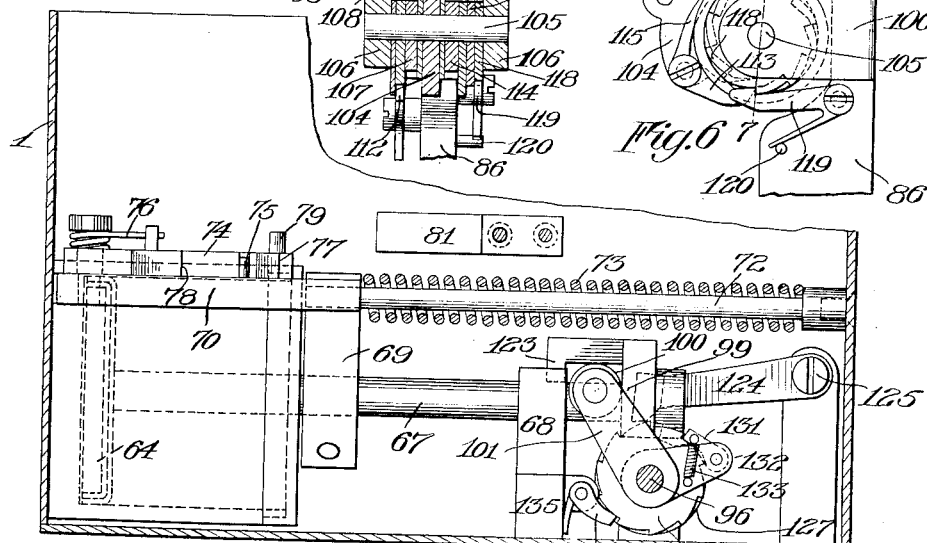
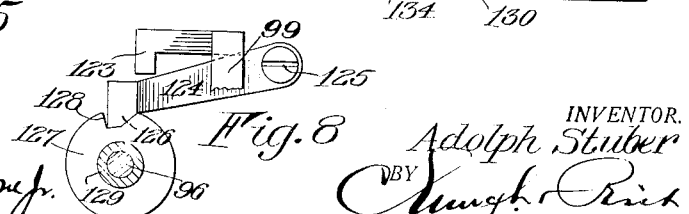
WITNESSES:
Francis Jerdone Jr.
Alvin K. Goodwin
INVENTOR.
Adolph Stuber
BY
his ATTORNEYS.

Dec. 18, 1923.
A. STUBER
1,478,010
REGISTERING MECHANISM
Filed Nov. 5, 1917   5 Sheets-Sheet 4
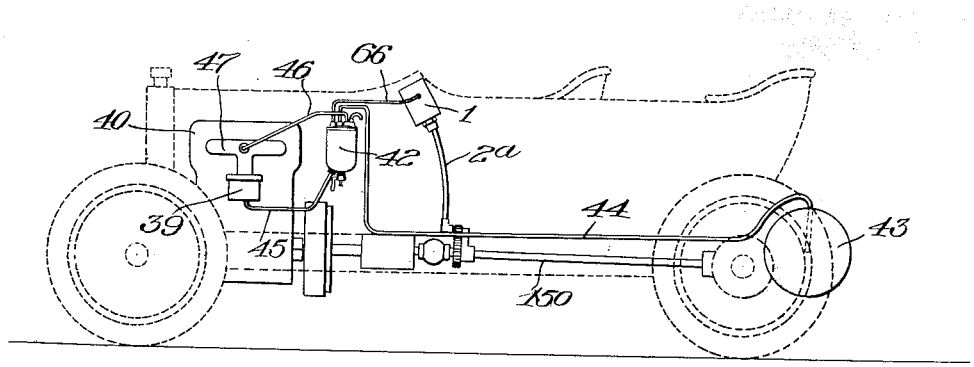
Fig.17
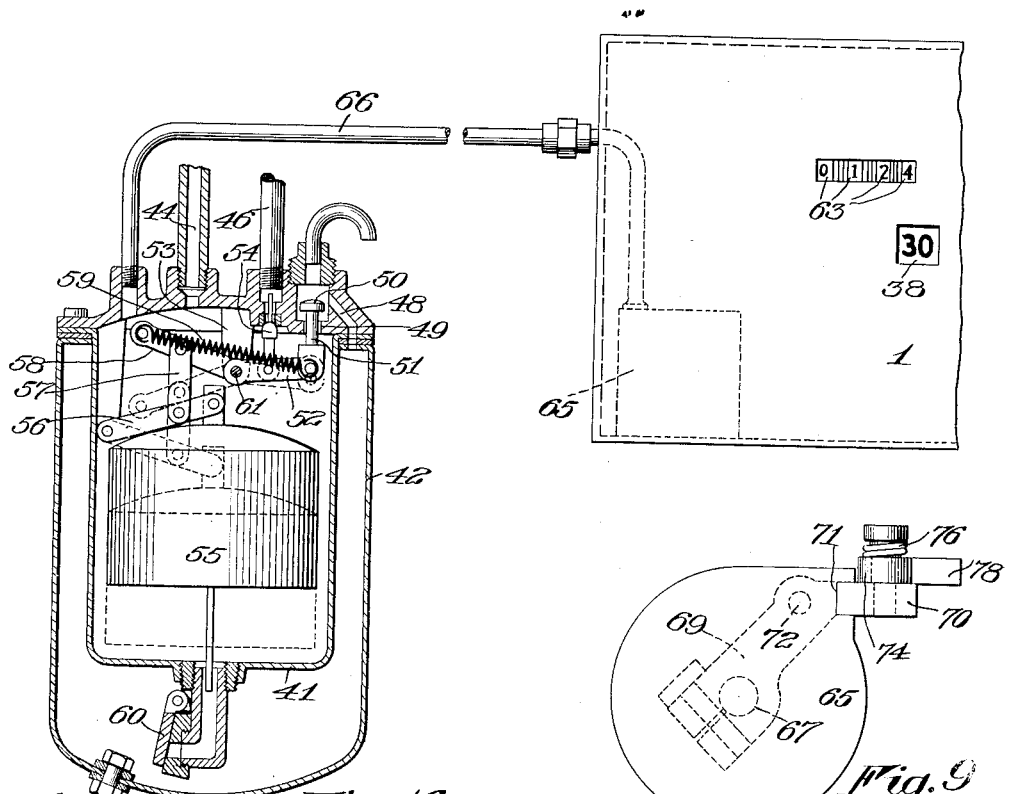
Fig.16
Fig.9
WITNESSES:
INVENTOR.
Adolph Stuber
BY
his ATTORNEYS.

Dec. 18, 1923.
A. STUBER
1,478,010
REGISTERING MECHANISM
Filed Nov. 5, 1917   5 Sheets-Sheet 5
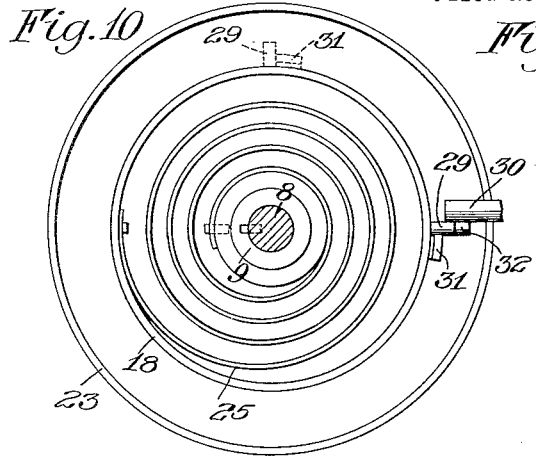
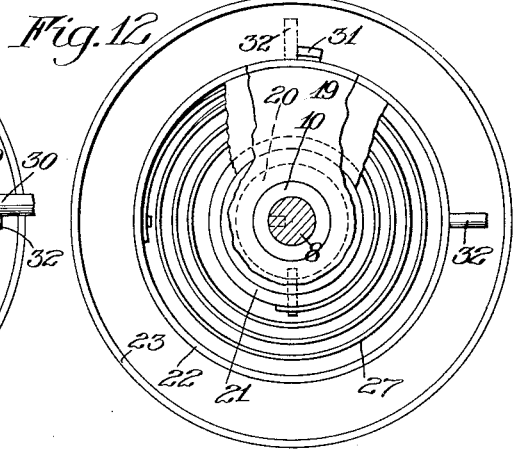
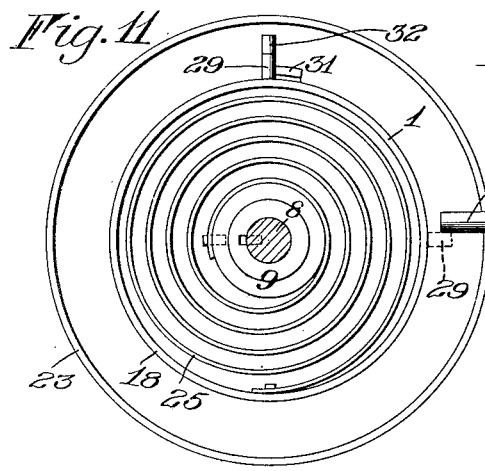
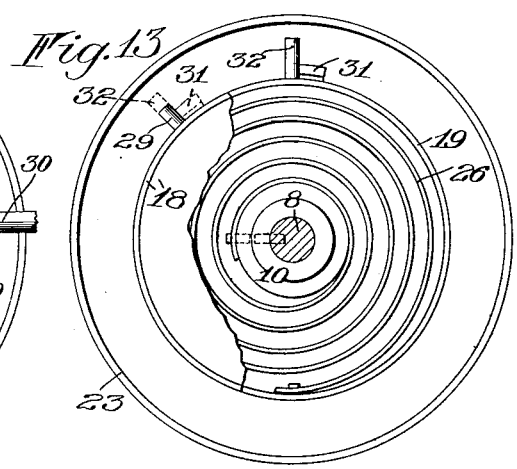
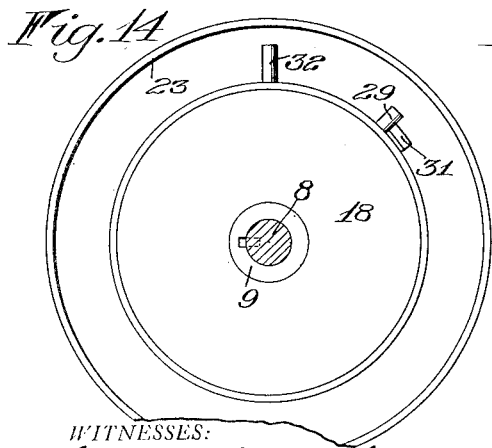
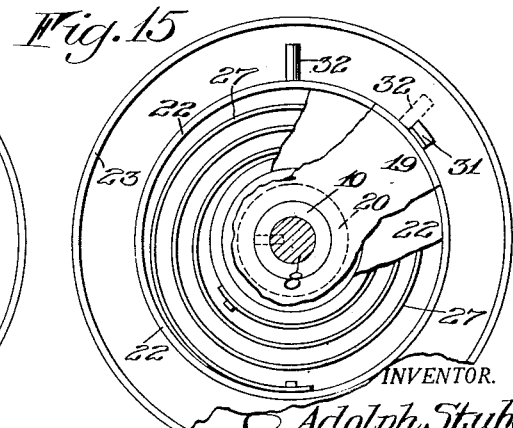

Patented Dec. 18, 1923.

1,478,010

UNITED STATES PATENT OFFICE.

ADOLPH STUBER, OF ROCHESTER, NEW YORK.

REGISTERING MECHANISM.

Application filed November 5, 1917. Serial No. 200,261.

*To all whom it may concern:*

Be it known that I, ADOLPH STUBER, of Rochester, in the county of Monroe and State of New York, have invented certain new and useful Improvements in Registering Mechanisms; and I do hereby declare the following to be a full, clear, and exact description of the same, reference being had to the accompanying drawings, forming a part of this specification, and to the reference characters marked thereon.

My present invention has for its object to provide means for determining the ratio in distance traveled per unit of fuel consumed by engine driven vehicles combined with devices for indicating the supply and total consumption of fuel and the speed and mileage of the vehicle as well. A further object of the invention is to provide a fuel-distance ratio-indicating mechanism driven by a movable part of a vehicle and periodically released by mechanism, the operation of which is dependent upon and controlled by a fuel feed system for supplying fuel to the motor of the vehicle. A further object of the invention is to provide a fuel-distance ratio-indicating or registering mechanism driven by a movable part of an engine propelled vehicle having a fuel measuring receptacle into which fuel is forced by a vacuum fuel feed system, said registering mechanism being periodically released pneumatically by a change of pressure in the system upon the entrance to or discharge from the measuring device of a predetermined quantity of fuel. A further object of the invention is to provide a plurality of registering devices, one of which is motor driven and provided with a pneumatic releasing mechanism serving as a driving means for the remaining registering device or devices. Still another object of the invention is to provide a motor driven indicating mechanism in combination with one or more pneumatically operated registering devices, the former being arranged to be released by the operating mechanism of the latter after a predetermined number of operations thereof. A still further object of the invention is to provide in connection with a motor driven vehicle a fuel-distance ratio-indicating mechanism in combination with the driving mechanism of a speedometer and a pneumatically operated fuel registering device serving to periodically effect the release of said indicating mechanism.

To these and other ends the invention consists in certain improvements and combinations of parts, all as will be hereinafter more fully described, the novel features being pointed out in the claims at the end of the specification.

In the drawings:

Figure 4 is a front view of the casing showing the relative positions of the several registering or indicating mechanisms therein;

Figure 5 is a transverse sectional view taken on line 5—5 of Figure 1;

Figure 6 is a sectional elevation taken on line 6—6 of Figure 1;

Figure 7 is a sectional elevation taken on line 7—7 of Figure 6, looking from the rear;

Figure 8 is a sectional view taken on line 8—8 of Figure 1;

Figure 9 is an end view of the pneumatically operated slide for effecting release of the ratio-indicating mechanism;

Figure 1:
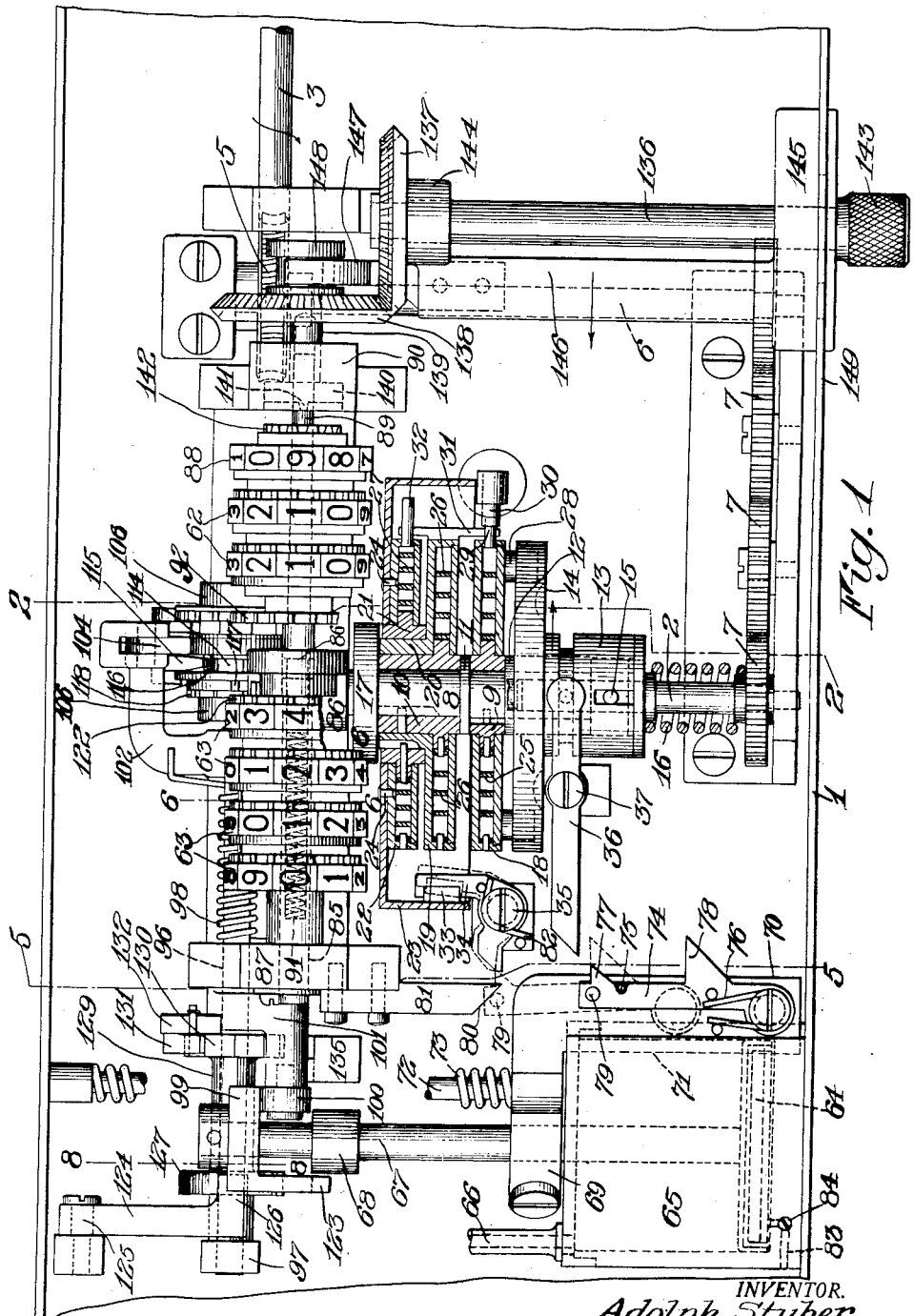
Figure 1 is a front elevational view of the fuel registering and ratio-indicating mechanisms, the latter being shown in section.

Figures 10 to 15 inclusive are views showing the relative positions of the indicating mechanism drums under operation;

Figure 16 is a sectional elevation through the fuel measuring receptacle and associated parts, and Figure 17 is a view showing the application of the invention to a motor driven vehicle.

Similar reference characters throughout the several views indicate the same parts.

The present invention comprises an indicating or registering mechanism for determining the ratio in distance traveled per unit of fuel consumed by motor driven vehicles, there being an indicating drum normally held stationary, with means for properly actuating and controlling the movement of the drum when released, said means being actuated by a driven shaft operatively connected with a movable part of the vehicle, preferably the flexible shaft for driving the speedometer mechanism. There is also provided a fuel registering mechanism in the same casing with the ratio-indicating and speedometer mechanisms. The fuel registering mechanism comprises means for indicating the total amount of fuel consumed as well as the amount in the supply tank at any given time and is pneumatically operated through a vacuum fuel feed system for supplying fuel to the motor. The release of the ratio-indicating drum is periodically effected by the pneumatically controlled actuating mechanism which effects operation of the fuel registering device. In the present instance the ratio-indicating drum is preferably released only after the consumption of each gallon of fuel, while the fuel registering device is operated by the pneumatically controlled mechanism at the expiration of every one-tenth of a gallon of fuel consumed. It is apparent, however, that the tripping mechanism for controlling the drum may be arranged or constructed to effect release thereof at each operation of the fuel registering device or at the expiration of any desired number of operations of the latter.

Figure 2:
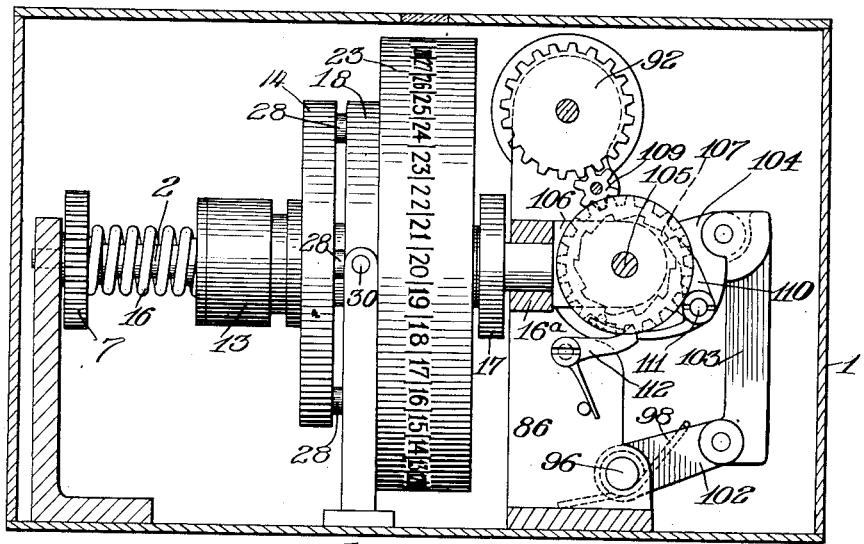
Figure 2 is a transverse sectional elevation taken on line 2—2 of Figure 1.
Figure 3:
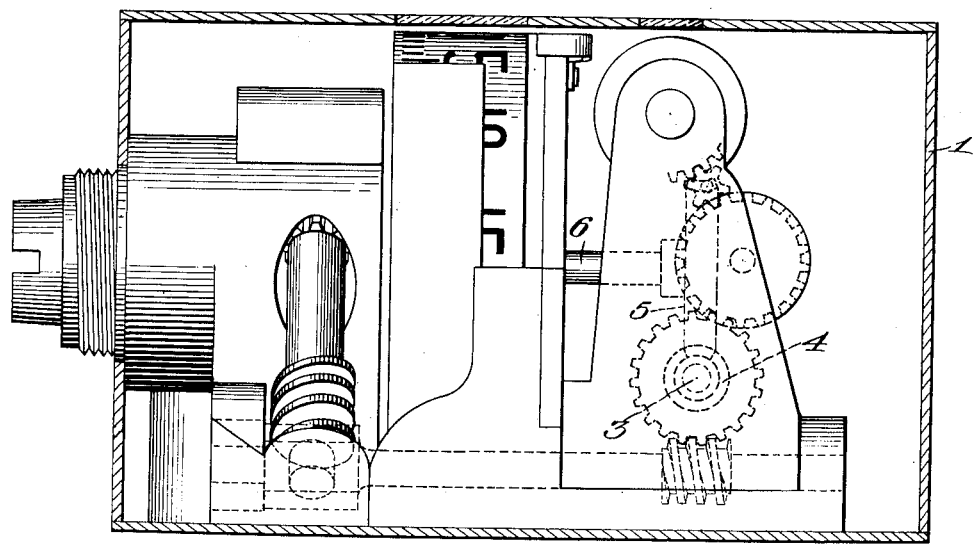
Figure 3 is a sectional view of the mechanism casing showing the manner of mounting the speedometer therein.

Referring to the drawings, 1 represents the casing enclosing the several registering mechanisms, that of the speed and mileage indicating device being best shown in Figure 3, and the ratio-indicating and fuel registering devices in Figure 1. The driving shaft 2 for the ratio-indicating mechanism is rotated by movement imparted from the flexible shaft 2ª driving the speedometer, the shaft 3 of the latter imparting rotative movement to the worm gears 4 and 5, transverse shaft 6 and train of gears 7, as shown in Figures 1 and 3. The shaft 2 is rotatably mounted within the stationary shaft 8 upon which are fixed the hubs 9 and 10 on opposite sides of the collar 11. Beneath the hub 9 a support 12 is provided in the form of a non-rotatable sleeve inserted upon the lower end of the stationary shaft 8. This sleeve also forms a bearing upon which the clutch members 13 and 14 are both rotatably and slidably mounted, rotation of the clutch members being effected by means of the pin 15 carried by the driving shaft 2. A compression spring 16 coiled about shaft 2 urges clutch member 13 toward clutch member 14. The upper end of the shaft 8 is held in a bearing as shown at 16ª in Figures 1 and 2. A collar 17 on the shaft prevents displacement in one direction of the hub 10 and parts mounted thereon. Rotatably mounted on the hubs 9 and 10 are the wheels or drums 18 and 19 respectively, the latter being provided with an extension 20 forming a seat upon which the hub 21 is fixed, said hub serving as a bearing upon which the drum 22 and indicating ring 23 are rotatably mounted, the drum and ring being rigidly connected by any suitable means, such as the rivets 24 shown in Figure 1.

Within the drums 18, 19 and 22 are mounted the coil springs 25, 26 and 27 respectively, as shown in Figure 1, the outer ends of the springs being secured to the peripheral walls of the drums while the inner ends are connected to the hubs or bearings upon which the drums are rotatably mounted. The cork or other flexible inserts 28 on the clutch member 14 engage the outer face of the drum 18, rotating the latter against the tension of the enclosed spring employed for returning said drum to normal position, which is determined by engagement of the peripheral pin 29 with the post or stop 30. The second spring drum or barrel 19 carries on its periphery a crosspiece 31 having one end in front of the pin 29 and its other end in a position to form a stop limiting the following movement of the drum 22 and ratio-indicating wheel 23 by contacting with the peripheral pin 32 projecting from the former, the movement of said drum and ratio-indicating wheel upon the hub 21 in a direction to the right (Figures 1 and 10) being effected only when the spring 27 is under tension and at such times as the indicating wheel may be released by the clutch member 33 on the bell crank 34 pivoted at 35 as shown in Figure 1. As long as the ratio-indicating wheel is held by the clutch and the drums 18 and 19 are being driven to the right from the position shown in Figures 1 and 10, the hub 21 will be rotated within the drum 22, thereby winding up the spring 27 so that when said indicating wheel is released it will be rotated by said spring until the pin 32 moves into contact with the upper arm of the cross piece 31 on the drum 19. The drum or wheel 23 carries upon its outer periphery the numerals indicating the ratio of miles traveled to the gallon or fraction of a gallon of fuel consumed by the engine and except when the wheel is rotating into a new position of adjustment it is locked in the position of last setting by means of the clutch member 33.

From this arrangement of the parts it will be seen that the slowly but constantly rotating clutch member 14 will carry the drums 18 and 19 through more or less of a partial revolution from the position shown in Figure 10 to that shown in Figure 11, and at the time of release of the indicating wheel the same will likewise have rotated a distance equal to that traveled by said drums. The tripping of the clutch member 33 is merely momentary, the same returning to locking engagement with the indicating wheel before the release of the clutch member 14 is effected by the lever 36 pivoted at 37, as shown in Figure 1, the operating mechanism for which will presently be explained. Upon release of the clutch member 14 immediately after the return of the clutch member 33 to lock the indicating wheel in its new position of adjustment, the spring 25 will return the drum 18 to normal position, but the drum 19 will be prevented from returning by means of the upper arm of the cross bar 31 being held by the pin 32 as shown in Figure 12, the normal or initial position of all of the drums being shown in Figure 10. If now the drum 18 is not rotated through as great an arc as before its pin 29 will form a stop for limiting the retrograde movement of the drums 19 and 22 to the position shown by dotted lines in Figure 13 when the indicating wheel 23 is again released by the clutch member 33. This retrograde movement in the direction toward the zero position is, of course, effected by the spring 26 in the drum 19, which when it moves this part backwardly causes the indicating wheel to be carried with it, but without working against the counter force of the spring 27 in the drum 22 as the latter is carried on the hub 21 of the drum 22. If, however, the drums 18 and 19 on the next operation advance to a position beyond that shown in Figure 11 to that shown in Figure 14, the spring 27 in the locked drum 22 will be wound up by means of the rotation of the hub 21 keyed to the hub 20 of the drum 19 and upon release of the indicating wheel the same will be carried forward until the pin 32 moves to the position shown by dotted lines in Figure 15, at which position the numeral "35" will appear through the opening 38 in the cover of the casing in Figure 4. In the first position of adjustment described the numeral "30" will appear in said opening 38 while in the second position described the numeral "25" will appear.

From the foregoing it will be seen that the first drum 18 comprises a controlling member, which is moved in the direction of rotation of the driving member or clutch 14, and causes the second drum 19 to advance with it, initially, and to travel in the same direction. This second drum may be designated a setting member since it limits the movement of the indicator in the advancing direction (i. e. in the direction of the movement of the driving device) thus setting the indicator, initially, and for any indication higher than the one previously displayed and resets the indicator by moving it in the opposite direction whenever the indicator is to be returned to, or toward, the zero position. The third drum 22 is in reality a part of the indicator since the latter is attached permanently thereto, and if this part is to be designated separately, it may be termed the advancing member.

The vacuum feed system for delivering fuel to the carburetor 39 of the motor 40 comprises the inner and outer fuel containers 41 and 42 respectively, the former comprising the fuel measuring chamber which is connected with the fuel supply tank 43 by means of the conduit 44 while the outer container 42 is connected with the carburetor 39 by the conduit 45 through which fuel is fed by gravity, since said container is located at a relatively higher point on the machine than the motor. In the present instance liquid fuel is drawn into the measuring chamber 41 through the conduit 44 leading to the supply tank 43 by effecting a reduction of pressure within said receptacle which is caused by connecting therewith a conduit 46 leading to the manifold 47 of the engine, whereby the engine suction is employed to force liquid through said conduit 44 as long as conduit 46 is open. In order to obtain atmospheric pressure in each of the containers when said liquid is fed by gravity to the carburetor I provide in the upper walls of the containers the ports 48 and 49. When liquid is being drawn into the measuring chamber 41 it is necessary, of course, to close the port 49 and this is done by providing the valve 50 on the stem 51 which is pivotally connected to the arm 52, the latter being pivoted to the support 53. Also pivotally mounted upon the arm 52 is a valve 54 for closing at the proper time the passageway leading to the suction conduit 46. The valves 50 and 54 are arranged to be alternately opened and closed by movement of the float 55 through the rise and fall of liquid in the measuring chamber. The float is pivotally connected with a lever 56 carrying an upstanding link 57 connected with an arm 58 which is also pivoted to the support 53 independently of the arm 52. The outer ends of the arms 52 and 58 are connected by a tension spring 59 which tends to lift or hold them in the position shown in Figure 16. With the arms in this position the float is substantially at its uppermost position, at which time the valve 54 is closed and fuel is fed by gravity past the check valve 60 and out of the container 42 to the engine. As the float descends to the position indicated by dotted lines in Figure 16, the spring 59 is carried below the pivot point 61 of the arms, at which time the valve 50 is seated and the valve 54 opened, thus allowing fuel to again be drawn into the measuring chamber to elevate the float. It will be understood, of course, that the size of the measuring chamber or movement of the float may be varied to provide any desired quantity of fuel as a unit to be indicated by the fuel registering device, the operation of which is controlled by a reduction of pressure in the measuring chamber.

The operation of the fuel registering and the release of the ratio-indicating devices are preferably both effected by combined mechanisms pneumatically operated upon a reduction of pressure in the fuel measuring receptacle 41 in a manner which will presently be explained.

The pneumatic release of the several clutch members, for the ratio-indicating mechanism is preferably adapted to be effected at the expiration of every tenth operation of the fuel registering device, but, of course, the parts may be so arranged as to effect any predetermined number of operations of the one relatively to the other, or if desired the ratio-indicating mechanism may be released each time the fuel registering device is operated.

The releasing of the clutch members 14 and 33 and operation of the fuel supply and total fuel consumption counters 62 and 63 respectively is effected by movement of the piston 64 within the cylinder 65 which is connected with the fuel measuring receptacle 41 by means of the conduit 66, as shown in Figure 16, it being understood that said piston is actuated by suction produced in the cylinder 65 when the cylinders of the engine are in communication with the fuel measuring chamber through the conduit 46.

The operation of the releasing mechanism will first be described and that of the fuel-register operating devices subsequently taken up. The piston rod 67 which is slidably mounted within the bearing 68 is provided with a laterally extending projection or arm 69 carrying a slide 70 arranged to travel upon a guideway formed on the cylinder as indicated at 71 in Figure 9. The arm 69 is arranged to slide upon the rod 72 carrying the spring 73 as shown in Figure 5, said spring serving to return the slide and piston to normal position as indicated in Figure 1, it being understood that the piston is moved outwardly from this position when suction is produced in the cylinder through the conduit 66.

Pivotally mounted on the slide 70 is the clutch tripping arm 74 normally held in contact with the pin 75 by the spring 76, as shown in Figure 1. The arm 74 is provided with the outer and inner shoulders or projections 77 and 78 respectively, the former serving to strike the free end of the bell-crank 34 to trip the clutch member 33 and the latter subsequently striking the free end of the lever 36 to effect release of the clutch member 14. The free end of the arm 74 is provided with a laterally projecting pin 79 arranged to travel on the beveled face 80 of the stationary stop bar 81 when the shoulder 77 engages the free end of the bell-crank 34, whereby the latter is released by said shoulder when it is tripped to the position indicated by dotted lines in Figure 1, after which it is returned to normal position by the spring 82 to again bring the clutch member 33 into locking engagement with the ratio-indicating wheel 23. Immediately thereafter the shoulder 78 on the arm 74 moves into contact with the outer end of the clutch operating lever 36, thereby retracting the clutch member 14 to cause the release of the drum 18. As soon as the valve 54 in the measuring tank closes the piston and piston rod, together with the slide 70 and tripping arm 74 are returned to normal position by the spring 73, at which time the spring 76 moves said arm back into contact with the pin 75, thus re-positioning the shoulder 77 in the path of the free end of the bell-crank 34, as shown in Figure 1. In order that the cushioning effect on the piston 64 may not be too great during its return to normal position I provide the port 83 in the end of the cylinder 65 and the adjusting screw 84 for increasing or decreasing the size of the port as the occasion demands.

In the provision of the fuel registering mechanism the numeral wheels 63 at the left of Figure 1 for totaling the amount of fuel consumed are mounted on the shaft 85, the opposite ends of which are seated in the right and left hand upstanding brackets or bearings 86 and 87 respectively. The subtracting counters 62 and 88, are mounted on the sliding shaft 89 movable in the bearings 86 and 90 to enable them to be reset to zero position. The shaft 89 when moved to the left from the position shown in Figure 1 and to the right in Figure 7, is arranged to be returned to normal position by the spring 91 within the hollow shaft 85. A gear 92 is rigidly mounted on the shaft 89 for driving the fraction indicating subtracting wheel 88 which is also fixed on said shaft and which upon each complete rotation advances the adjacent unit subtracting wheel 62 one step.

The numeral wheels 62 and 88 which are set by means of a device which will subsequently be described, indicate the number of gallons or units of fuel placed in the supply tank at any given time, the wheel 88 being divided preferably into ten equal spaces each representing one-tenth of a gallon, while the numeral wheels 62 are also divided into ten equal spaces, for representing whole gallons in the units and tens order respectively. For each revolution of the wheel 88 the adjacent wheel 62 will be moved by the gear 93 on the shaft 94 to subtract from the total amount of fuel in the tank the last gallon consumed by the engine and likewise the gear 95 will actuate the second wheel 62 at the proper times until all of the fuel placed in the supply tank is consumed.

The means for actuating both the totaling and subtracting sets of counters or wheels comprises mechanism operated by the piston 64 each time a reduction of pressure in the cylinder 65 is effected which occurs every time the valve 54 in the vacuum tank 41 is opened. This mechanism comprises the oscillatory shaft 96 rotatably mounted upon the bearings or brackets 86, 87 and 97 as ment of the piston 64 and consequent release of the ratio-indicating and brake drums 23 and 18 respectively can only be effected at the expiration of the consumption or discharge from the measuring receptacle of whatever quantity of fuel may have been previously determined upon as a basis of operation.

The means for resetting the subtracting counters 88 and 62 is best shown in Figure 1, and comprises the shaft 136 carrying the beveled gear 137 meshing with a similar gear 138 on the shaft 139 which is slidably mounted in the bracket 90 and provided with a disc 140 having a tooth-like projection 141 arranged to be moved into and out of engagement with the teeth 142 of the counter 88 when desired. The shaft 136 is actuated by means of the knurled knob 143 and is rotatable in the bearing 144 and slide 145 which are rigidly connected by the transverse bar 146. From the inner end of the bar projects fork 147 loosely connected with the hub 148 of the gear wheel 138, whereby the latter is moved upon movement of the slide 145. The slide is provided with relatively long bearing faces on each side of the wall 149 of the mechanism casing to insure proper alinement of the parts connected therewith.

The speedometer shown in Figure 3 and to the right of Figure 4, may be of any preferred type and is driven in the present instance by the transmission drive shaft 150 through the flexible shaft 2ª, as shown in Figure 17.

The invention set forth herein is not intended to be limited in its use to means for determining the ratio in distance traveled by engine driven vehicles for predetermined quantities of fuel consumed thereby, but comprehends as well means for determining the amount of work performed by engines or motors of various types, whether stationary, or movable, by providing a ratio-indicating mechanism actuated by some driven part of the engine and released periodically by suitable means, preferably controlled by the fuel feed system for supplying fuel to the engine.

I claim as my invention:

1. The combination of a motor, means for feeding fluid fuel thereto comprising a pressure controlled fluid measuring device, an indicator, mechanism for setting said indicator having an actuating connection with a part driven by said motor, pressure responsive means communicating with said measuring device, and an actuating connection between said pressure responsive means and setting mechanism for periodically controlling the latter in response to variations in pressure in said measuring device.

2. The combination of a motor, means for feeding fluid fuel thereto comprising a pressure controlled fluid measuring device, an indicator, mechanism for setting said indicator having an actuating connection with a part driven by said motor, locking means normally holding said indicator against movement in either direction, pressure responsive means communicating with said measuring device, and controlling means connected with said pressure responsive means for periodically releasing said indicator from said locking means and interrupting the operation of said setting mechanism.

3. The combination of a motor, means for feeding fluid fue' thereto comprising a pressure controlled fluid measuring device, an indicator, mechanism for setting said indicator having an actuating connection with a part driven by said motor, a cylinder connected by piping with said measuring device, and a piston in said cylinder connected with said setting mechanism for periodically controlling the latter in response to variations in pressure in said measuring device.

4. The combination of a motor, means for feeding fluid fuel thereto comprising a pressure controlled fluid measuring device, an indicator, mechanism for setting said indicator having an actuating connection with a part driven by said motor, locking means normally holding said indicator against movement in either direction, a cylinder connected by piping with said measuring device, and a piston in said cylinder connected with said locking means and setting mechanism for periodically releasing said indicator and interrupting the operation of said setting mechanism in response to variations in pressure in said measuring device.

5. A registering mechanism comprising a rotatable indicating member, setting means connected with said member for rotating the same to effect an indication, driving means for said setting means, means normally holding said indicating member against rotation, and a pressure responsive device provided with means for releasing said indicating member from said holding means to set the same and for disconnecting said setting and driving means.

6. A registering mechanism comprising a rotatable indicating member, setting means connected with said member for rotating the same to effect an indication, driving means for said setting means, means normally holding said indicating member against rotation, a pressure responsive device including a reciprocating element, and parts actuated by said element for alternately actuating said holding means to release and set said member and for disconnecting said setting and driving means.

7. A registering mechanism comprising a rotatable indicating member, setting means connected with said member for rotating the shown in Figures 1, 2 and 5. The shaft is rotated in one direction by the tension spring 98 wound thereon and in an opposite direction upon the return of the piston 64 to normal position by the angular projection 99 on the piston rod 67 upon which travels the roller 100 mounted on the crank arm 101 which is rigidly connected with the shaft 96 adjacent the bracket 87, Figs. 1 and 5. On the inner end of the shraft 96 is a crank arm 102 (Fig. 2) connected with one end of a link 103, the other end of which is connected with a segment 104 pivotally mounted on the short shaft 105, the opposite ends of which are seated in the spaced angular arms or projections 106 preferably cast integral with the upstanding bracket 86, as shown in Figures 6 and 7. Rotatable upon the short shaft 105 at the left of the segment 104 in Figure 7 is a ratchet wheel 107 with which is connected a gear 108 meshing with the pinion 109 on the shaft 94, said pinion serving to drive the gear 92, shaft 89 and counter 88 thereon. The ratchet wheel 107 is driven by the pawl 110 pivoted at 111 to the segment as shown in Figure 2. A dog 112 on the bracket 86 prevents the backward rotation of the gear wheel 108 by engaging the teeth thereof as shown. The return of the arm 102 and rock-shaft 96 to normal position as shown in Figure 2, will move the link 103 and segment 104 upwardly to effect operation of the pawl 110 after the same has been moved downwardly over the next succeeding tooth of the ratchet wheel 107. From this construction it will be seen that for every operation of the piston 64 the rocker arm 102 will be oscillated to effect operation of the subtracting counter 88 through the shaft 89, gear 92, pinion 109, gear 108 and ratchet 107.

The mechanism for operating the total counters 63 is also controlled by the arm 102 through the link 103 and segment 104. In this connection it is necessary to rotate the counters 63 in an opposite direction from that in which the counters 62 and 88 are rotated as one set is adapted to add and the other subtract the quantity of fuel consumed, and in order to accomplish this result by rocking the segment 104, I provide thereon the pawl 113 held in engagement with the teeth of the ratchet wheel 114 by means of the spring arm 115 restricted against inward movement by the pin 116 at the outer edge of the segment, as shown in Figure 6. The ratchet 114 which is rotatable upon the shaft 105 carrying the gear 117 and outer ratchet 118, is rigidly connected with the latter so that they will all rotate together in either direction and are all locked against backward rotation by the spring dog 119 held in engagement with the ratchet 118 by means of the pin 120, as shown in Figure 6. The driving gear 117 is provided with only a sufficient number of teeth, two being shown in the present instance, to effect in one revolution thereof through pinion 121 but one tenth of a revolution of the gear 122. During the same time a complete revolution of the subtracting counter 88 is effected which deducts one gallon from the indicated supply of fuel in the main tank, while one-tenth of a revolution of the gear 122 and inner totaling counter 63 serves to add one gallon to the indicated total quantity of fuel fed through the measuring device. This follows from the fact that subtracting counter 88 indicates in tenths of a gallon while totaling counter 63 indicates in whole gallons.

The extreme movement of the clutch tripping arm 74, as shown by dotted lines in Figure 1, is not permitted until the rock-shaft 96 has been operated, in the present instance ten times, to effect the registering of one gallon of fuel fed through the measuring tank 41.

The means for preventing the extreme outward movement of the piston rod 67 and the parts carried thereby during nine of said operations comprises the finger 123 of the angular projection 99 on the piston rod, said finger having a rearwardly extending projection normally striking the inner end of the arm 124, pivoted at 125, when the arm is in the position shown in Figure 5. This arm is provided with a tooth or projection 126 (Figure 8) which normally rides on the periphery of the driven wheel 127 but which is adapted on the tenth operation of the rock-shaft 96 to drop into the notch 128 on said wheel to permit the finger 123 to clear said projection as shown in Figure 8, whereby the movement of the piston 64 and piston rod 67 will be unrestricted by said parts and the shoulders 77 and 78 of the clutch tripping arm 74 will be free to move into engagement with the clutch operating levers 34 and 36 respectively.

The notched wheel 127 is carried on the outer end of a sleeve 129 rotatable on the rock-shaft 96, said sleeve being provided with a ratchet 130 for driving the wheel 127 to bring the notch thereof under the projection 126 of the pivoted arm 124 for the purpose stated which occurs at the expiration of the consumption of each gallon of fuel by the engine. The ratchet 130 is driven by the pawl 131 pivoted upon the arm 132 of the bell-crank 101, as shown in Figure 5. The pawl is held in engagement with the teeth of the ratchet by means of the spring 133 while backward rotation of said ratchet is prevented by the spring actuated dog 134 pivoted upon the bracket 135 (Fig. 5).

It should be borne in mind, of course, that the notched wheel 127 makes one revolution for every one made by the subtracting counter 88 and that the extreme outward move-same to effect an indication, driving means connected with said setting means, spring means for returning said setting means to a given starting position, means normally holding said indicating member against rotation, a pressure responsive device including a reciprocating element, and parts carried by said element for intermittently actuating said holding means to release and set said indicating member and for disconnecting said setting and driving means.

8. A registering mechanism comprising a rotatable indicating member, a driving element and means between the latter and the indicating member for imparting rotative movement to said member, means normally holding said member against rotation in either direction, a device for moving the driving element into inoperative position, and pressure responsive means arranged to disconnect said holding means from the indicating member and actuate said device.

9. A registering mechanism comprising a rotatable indicating member, setting means connected with said member for rotating the same to effect an indication, driving means connected with said setting means, spring means for returning said setting means to a given starting position, means normally holding said indicating member against rotation, a pressure responsive device including a reciprocating element, a latch movably carried by said element for engagement with said holding means to release said indicating member during movement of said element, means for moving said latch out of engagement with said member after release of the latter, and a part actuated by said element for disconnecting said driving and setting means between successive releases of said indicating member.

10. A registering mechanism comprising a rotatable indicating member, setting means connected with said member for rotating the same to effect an indication, driving means connected with said setting means, spring means for returning said setting means to a given starting position, a brake normally holding said indicating member against rotation, a cylinder, a piston therein having a piston rod, a latch operated by said rod in one direction of movement for engaging and releasing said brake to momentarily release and set said member, and means actuated by said rod for momentarily disconnecting said driving and setting means between successive operations of said brake.

11. A registering mechanism comprising a rotatable indicating member, a driving element and means between the latter and said member for imparting rotative movement to said member, a brake normally holding said member against rotation, a device for moving the driving element into inoperative position, a cylinder having a piston and a releasing device operated by said piston and arranged to disconnect said brake from said member, release said brake, and move the driving element into inoperative position.

12. In an indicating mechanism, the combination with a shaft, a driving member movable longitudinally thereof and rotated thereby, a first rotary member rotated by the driving member, a second rotary member driven by the first, an indicating member and a spring connection between the latter and the second rotary member, of a brake normally holding the indicating member against rotation, trips for moving the brake and driving member and means for operating them conjointly.

13. In an indicating mechanism, the combination with a shaft, a driving member movable longitudinally thereof and rotated thereby, a first rotary member rotated by the driving member, a second rotary member rotated by the first, springs attached to a relatively stationary part and to said rotary members for rotating them in one direction, an indicating member and a spring connection between the latter and said second rotary member, of a brake normally holding the indicating member against rotation and means for releasing the brake and disengaging the driving member periodically.

14. A registering mechanism comprising a rotatable indicating member, a brake normally holding said member against rotation, a setting mechanism for operating said indicating member when released, driving means for actuating said setting mechanism, an element supported for reciprocating movement, means for actuating the same, a brake operating member pivoted on said element, a brake means for actuating said brake, operating means to release said brake when said element is moved in one direction, and means for returning said brake to normal position after the release thereof by said operating member.

15. A registering mechanism comprising a rotatable indicating member, a clutch normally holding said member against rotation, setting mechanism for operating said rotatable indicating member when released, driving means releasably engaging said setting mechanism and pneumatically controlled means for periodically releasing said clutch to permit operation of the rotatable indicating member and thereafter effecting release of said driving means.

16. A movable indicating member, holding means normally preventing movement of said indicating member, setting mechanism for operating said movable indicating member when released, means for driving said setting mechanism releasably engaging the same, and pneumatically controlled devices for releasing said holding means and the driving device for said setting mechanism.

17. In a registering device, a movable indicating member, holding means normally preventing movement of said indicating member, means for operating said indicating member when released, means arranged to be driven from a predetermined starting point for actuating said operating means, driving means releasably engaging said last mentioned means, means for returning the latter to said starting point, and pneumatically operated control means for first releasing said holding means and thereafter causing said driving means to release the means for actuating said operating means.

18. A registering mechanism comprising a rotary indicating member, locking means tending to hold said member against rotation, means for setting said member when released, releasable driving means for said setting means, control means for said setting means, periodically moving actuating means for said control means, devices limiting movement of said actuating means over a plurality of periods and subsequently releasing the same for amplified movement, and cooperating parts on said actuating and control means for releasing said locking and driving means upon amplified movement of said actuating means.

19. A registering mechanism comprising an indicating member, setting mechanism therefor, an oscillatory member, means for actuating said oscillatory member in one direction, a reciprocatory member for moving said oscillatory member in an opposite direction, means for effecting movement of the reciprocatory member, means normally limiting the movement of said reciprocatory member in one direction and permitting extended movement thereof in the same direction after a predetermined number of partial reciprocations thereof, and means controlled by the reciprocatory member and arranged when the latter is extended to cooperate with the setting mechanism to effect a complete operation thereof.

ADOLPH STUBER.